Jan. 29, 1924.
C. R. WATKINS
HOOK
Filed May 10, 1923
1,482,056
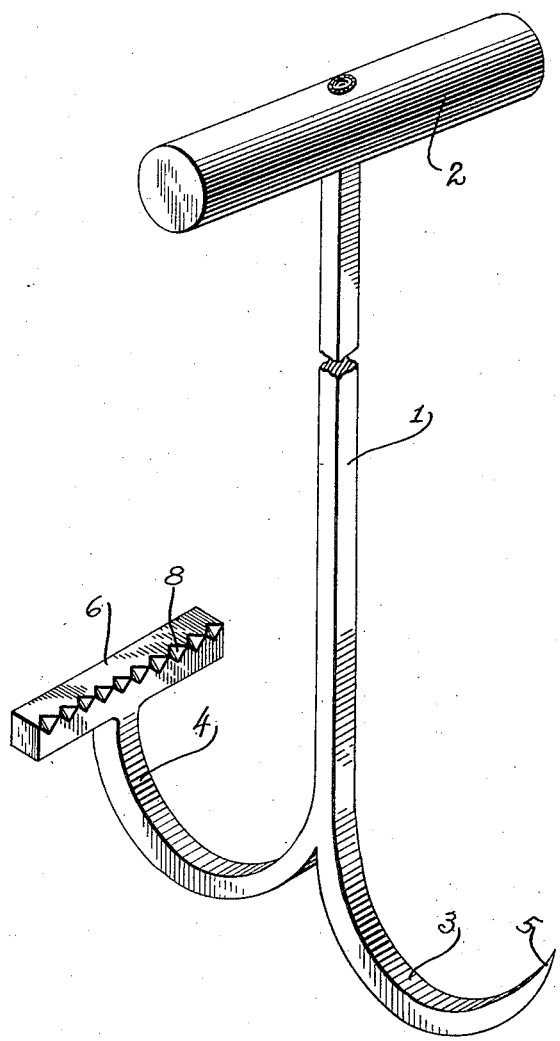
C. R. Watkins, Inventor
By William J. Jacobi, Attorney Patented Jan. 29, 1924.

1,482,056

UNITED STATES PATENT OFFICE.

CHARLES R. WATKINS, OF MEMPHIS, TENNESSEE.

HOOK.

Application filed May 10, 1923. Serial No. 638,037.

*To all whom it may concern:*

Be it known that CHARLES R. WATKINS, a citizen of the United States, residing at Memphis, in the county of Shelby and State of Tennessee, has invented certain new and useful Improvements in Hooks, of which the following is a specification.

This invention relates to a hook and has for its principal object to provide a simple and efficient device for use in connection with handling bales, bags, boxes or the like.

Another important object of the invention is to provide a hook of the above mentioned character, which is of such construction as to enable the same to be used in connection with the lifting of the bag, bale or the like, and then reversing the tool in order to enable the object to be easily handled without causing injury to the contents of the bag or bale.

A still further object of the invention is to provide a hook which is simple in construction, inexpensive, strong, and durable, and well adapted for the purpose for which it is designated.

Other objects and advantages of this invention will become apparent during the course of the following description.

In the accompanying drawings forming a part of the specification and in which like numerals designate like parts throughout the same, The figure represents a perspective view of my hook.

In the drawings wherein for the purpose of illustration is shown a preferred embodiment of my invention, the numeral 1 designates the shank of my invention and is secured at one end to the handle 2 in the usual manner. The opposite end of the shank 1 is bifurcated as more clearly shown in the drawing for forming a pair of arms 3 and 4 respectively.

These arms 3 and 4 respectively are bent in opposite directions, and one of the arms terminates into a sharp point designated by the numeral 5 of the drawing. The opposite arm 4 is provided with a T-head designated by the numeral 6 and this T-head 6 is substantially square in cross section and is provided with a series of notches as at 8 in the drawings and which are formed in the upper edge of the T-shaped head as more clearly shown in the drawings.

In use, the hook is adapted to have its pointed hook element 3 inserted in a box or the like which is desired to be moved, and, by grasping the handle 2, the object secured on the pointed end of the hook 3 will be easily and quickly transported. When desired to use the hook for the purpose of handling a bale or merchandise, or a bag containing various kinds of goods, the T-shaped head 6 is adapted to have its serrated edge engage the cover around the bale and will thereby permit the bale to be readily grasped and held in a position so as to enable the person using the hook to easily move the bale without damaging the contents therein.

It has been experienced in connection with the handling of cotton goods put up in bales, that when a hook is used to move the bales around the sharpened point of the hook will damage the contents of the bale and thereby cause injury to the goods. Whereas with the use of a hook of the above mentioned character the possibility of injuring the contents of the bale is to a great extent prevented, and at the same time enables the bale to be easily and readily handled.

Furthermore, the simplicity of my tool enables the same to be obtained at the minimum cost, and may also be formed of any suitable material.

From the foregoing description of the construction of my improved apparatus, it will be seen that I have provided a simple, inexpensive, and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

I claim:

A tool of the class described comprising a handle, a shank bifurcated at its outer free end and forming a pair of arms, said arms being bent in opposite directions, one of said arms provided with a T-head and having serrations on its upper edge.

In testimony whereof I affix my signature.

CHARLES R. WATKINS.